(12) United States Patent
Dumornay et al.

(10) Patent No.: US 7,170,016 B2
(45) Date of Patent: Jan. 30, 2007

(54) BODY MASS RELATED RISK FACTOR SCALE

(76) Inventors: Jean D. Dumornay, 310-C Howard Ave., Lancaster, PA (US) 17602; Nerlande M. Dumornay, 310-C Howard Ave., Lancaster, PA (US) 17602

( * ) Notice: Subject to any disclaimer, the term of this patent is extended or adjusted under 35 U.S.C. 154(b) by 214 days.

(21) Appl. No.: 10/886,535

(22) Filed: Jul. 9, 2004

(65) Prior Publication Data
US 2006/0006005 A1 Jan. 12, 2006

(51) Int. Cl.
A61B 5/053 (2006.01)
G01G 19/414 (2006.01)

(52) U.S. Cl. .................. 177/25.13; 177/245; 600/547

(58) Field of Classification Search .. 177/25.13–25.17, 177/25.19, 245; 600/547
See application file for complete search history.

(56) References Cited

U.S. PATENT DOCUMENTS

| | | | | |
|---|---|---|---|---|
| 3,655,003 A | * | 4/1972 | Yamajima | 177/173 |
| 3,667,561 A | * | 6/1972 | Hutchinson et al. | 177/245 |
| 3,866,699 A | | 2/1975 | Soehnle et al. | 177/34 |
| 4,113,039 A | | 9/1978 | Ozaki et al. | 177/25 |
| 4,301,879 A | | 11/1981 | Dubow | 177/5 |
| 4,318,447 A | | 3/1982 | Northcutt | 177/25 |
| 4,336,855 A | * | 6/1982 | Chen | 177/245 |
| 4,366,873 A | | 1/1983 | Levy et al. | 177/25 |
| 4,423,792 A | | 1/1984 | Cowan | 177/25 |
| 4,518,052 A | * | 5/1985 | Chen | 177/245 |
| 4,576,244 A | * | 3/1986 | Zeigner et al. | 177/25.19 |
| 4,577,710 A | | 3/1986 | Ruzumna | 177/245 |
| 4,629,015 A | | 12/1986 | Fried et al. | 177/25 |
| 4,773,492 A | * | 9/1988 | Ruzumna | 177/25.19 |
| 4,844,187 A | | 7/1989 | Jabero | 177/5 |
| 5,415,176 A | * | 5/1995 | Sato et al. | 600/547 |
| 5,763,837 A | | 6/1998 | Davignon et al. | 177/25.13 |
| 6,152,880 A | * | 11/2000 | Okada | 600/490 |
| 6,256,532 B1 | * | 7/2001 | Cha | 600/547 |
| 6,447,424 B1 | * | 9/2002 | Ashby et al. | 482/8 |
| 6,538,215 B2 | | 3/2003 | Montagnino et al. | 177/25.16 |
| 6,539,310 B2 | * | 3/2003 | Shimomura | 702/19 |
| 6,621,013 B2 | | 9/2003 | Tanida et al. | 177/4 |

(Continued)

FOREIGN PATENT DOCUMENTS

EP 1 092 388 4/2001

(Continued)

*Primary Examiner*—Randy W. Gibson
(74) *Attorney, Agent, or Firm*—Richard C. Litman

(57) ABSTRACT

A body mass related risk factor scale with a weight scale that measures and determines a person's weight, a height measuring device for determining the height of the person being weighed, a mini-keyboard for data input purposes, a set of specialized keys for technical configuration and operation of the body mass related risk factor scale. A microprocessor for calculating the risk factor, processing and organizing data associated with the body mass related risk factor scale. The body mass related risk factor scale also has a color liquid crystal diode display for displaying data, an internal battery for maintaining the time and date in the event of a power outage and a mini-printer to print data associated with the scale. A body mass related risk factor color code for easy interpretation of the results and a reset button to reset the scale in case of malfunction is also provided.

12 Claims, 4 Drawing Sheets

U.S. PATENT DOCUMENTS

| | | | |
|---|---|---|---|
| 2002/0049546 A1 | 4/2002 | Shimomura | 702/19 |
| 2002/0062090 A1 | 5/2002 | Chai et al. | 600/547 |
| 2004/0035611 A1 | 2/2004 | Honda et al. | 177/25.19 |
| 2004/0262046 A1* | 12/2004 | Simond et al. | |

FOREIGN PATENT DOCUMENTS

| | | | | |
|---|---|---|---|---|
| JP | 62-75217 A | * | 4/1987 | 177/25.19 |
| JP | 4-364426 A | * | 12/1992 | 177/25.19 |

\* cited by examiner

BODY MASS RELATED RISK FACTOR SCALE

BACKGROUND OF THE INVENTION

1. Field of the Invention

The present invention relates to a scale that measures an individual's body mass and related health risk factors. The scale and its output are also color-coded for added simplicity.

2. Description of the Related Art

Devices that measure health factors such as body fat are an example of the sophisticated measurements and data that are used in determining the health of a particular person. Basic personal data such as height, weight, age and gender can be combined with other types of data, such as the fat mass index and the bioelectrical impedance measuring unit, and can be used to measure the overall health of a person. Devices that obtain and calculate this type of health data have also become more sophisticated and are reflected in the related art.

U.S. Patent Application Publication Number 2002/0049546 published on Apr. 25, 2002, outlines the use of an apparatus that provides an easy to understand representation of fat tissue and lean tissue in the body constitution of a subject. The apparatus calculates an index body fat mass, a fat mass index, a lean mass index and a body mass index from entered body data and measured bioelectric impedance.

U.S. Patent Application Publication Number 2002/0062090 published on May 23, 2002, outlines the use of an apparatus and method for measuring the body fat of a live subject. The apparatus has a current source connected in parallel with two or more reference resistors and the subject's body. The connections to the body are made via an array of electrodes. The resistors and the subject's body are switched in and out of the circuit and the various voltages across the resistors and the body are detected by a voltage drop measuring device and are input into an analog-to-digital converter.

U.S. Patent Application Publication Number 2004/0035611 published on. Feb. 26, 2004, outlines the use of a body weight managing apparatus with a body weight measuring unit, a bioelectric impedance measuring unit, a body water content evaluation unit and a health condition evaluation unit. According to the apparatus, the body weight measure unit measures the body weight of a person to be measured and the bioelectric impedance measuring unit applies an alternating current to the body of the person and measures a bioelectric impedance value.

U.S. Pat. No. 3,866,699 issued to Soehnle et al. on Feb. 18, 1975, outlines the use of a scale that has a platform for a person to be weighed and an indicator, which shows the actual weight of the person on a dial while indicating the magnitude of deviation of the actually determined weight from the ideal weights associated with respective different body heights.

U.S. Pat. No. 4,113,039 issued to Ozaki et al. on Sep. 12, 1978, outlines the use of a body weight measuring apparatus, wherein various conditioning data, such as the height, sex and the like of a person to be measured is adapted to be included in advance and a determination is adapted to be made of the relativity of the measured body weight with the standard body weight.

U.S. Pat. No. 4,301,879 issued to Dubow on Nov. 24, 1981, outlines the use of a body weight scale system with a historical display. The system includes a transducer for generating a succession of digital weight signals representative of a user's body weight at a succession of points in time. The system further includes a data entry device, which provides time signals representative of the points in time associated with the various weight signals.

U.S. Pat. No. 4,318,447 issued to Northcutt on Mar. 9, 1982, outlines the use of an electronic digital readout diet scale for measuring and displaying weight information. A microcomputer is used to enable a dieter to enter a diet program having an objective weight and a given time interval. The scale will indicate the amount of weight to be lost or gained in order to achieve the objective weight as well as the deviation between the current weight and the projected weight according to the diet program.

U.S. Pat. No. 4,366,873 issued to Levy et al. on Jan. 4, 1983, outlines the use of an electronic scale for use in a weight control program in which the weighing histories and desired weight goals for each of a number of individuals are stored. A microprocessor assembles two types of messages, at least one informational and at least one psychologically reinforcing, from stored message components in accordance with the identified individual's stored weighing history and stored desired weight goal.

U.S. Pat. No. 4,423,792 issued to Cowan on Jan. 3, 1984, outlines the use of an electric scale apparatus, which provides weight control information and a method of controlling weight, which employs a scale apparatus. The apparatus has a scale member for measuring the weight of a person at a selected point in time. An electrical signal is generated in response to the measured weight. The apparatus further includes a memory for storing weight information, which may include a base weight introduced previously into the memory. The apparatus includes an electric circuit in which the generated signal is processed so that the weight of the person at the selected point in time can be compared against the base weight.

U.S. Pat. No. 4,577,710 issued to Ruzumna on Mar. 25, 1986, outlines the use of an apparatus for promoting good health that has a personal weight scale provided with an information and message center for displaying messages to a user. The scale may be embodied in a standard version for providing standard messages based upon departure of measured weight from desired weight. In another embodiment, the scale is adapted to provide customized information related to a particular medical condition of the particular user.

U.S. Pat. No. 4,629,015 issued to Fried et al. on Dec. 16, 1986, outlines the use of a weight monitoring system that provides a visual readout to compare an actual weight change in a patient undergoing a change of weight treatment against the elapsed time of treatment. In one embodiment, the actual weight loss is displayed in bar form against the elapsed time, also in bar form. In a second embodiment, the read-out uses a display screen for graphically displaying a chronological sequence of differences between a programmed weight change and an actual weight change.

U.S. Pat. No. 4,844,187 issued to Jabero on Jul. 4, 1989, outlines the use of an apparatus that will provide an individual with personal dietary information specifically tailored to the health needs of the particular individual. The individual will manually enter data pertaining to age, sex and height as well as the individual's dietary restrictions. Another embodiment of the invention includes determining the weight and the pulse rate of the individual during aerobic exercise.

U.S. Pat. No. 5,763,837 issued to Davignon et al. on Jun. 9, 1998, outlines the use of an apparatus and method for measuring the height and weight of human subjects using an electronic scale. The apparatus and method are also capable of calculating the surface area and body mass index and the percentile and weight for the age and sex of the subject.

U.S. Pat. No. 6,538,215 issued to Montagnino et al. on Mar. 25, 2003, outlines the use of an electronic digital bathroom scale, that is specifically programmed to provide a user's weight as well as personalized weight management information such as current weight, absolute as well as percentage change in weight, a graph of the minimum and maximum weight for the average person matching the user's profile and information about the number of calories that should be consumed in order to either maintain weight or lose one pound per week.

U.S. Pat. No. 6,621,013 issued to Tanida et al. on Sep. 16, 2003, outlines the use of a living body measuring device that stores the measured body weight value and bioelectrical impedance value as well as the personal body information set in the initial stage and compares the measured values with those stored values. The device also determines a current subject who is being measured by considering the most proximal values to be the data associated with the measured subject, thereby calculating a body-related index.

European Patent Application EP 1 092 388 granted to Komatsu et al. on Apr. 18, 2001, outlines the use of a body composition measuring apparatus based on bioelectrical impedance measurement. The person under test enters or sets the personal body information such as height, sex and age, while standing on the weight meter or scale. The apparatus measures the bioelectrical impedance and calculates the body fat percentage and the fat mass of the person being tested and displays the resultant value.

Although each of the outlined inventions are novel and non-obvious, what is really needed is a more simple device and with easy to understand data that can reflect the overall health of a person being evaluated (perhaps utilizing color-coding). If such a device is developed, it would be well-received in the marketplace and would meet a great current demand.

None of the above inventions and patents, taken either singly or in combination, is seen to describe the instant invention as claimed. Thus a color-coded body mass related risk factor scale solving the aforementioned problems is desired.

SUMMARY OF THE INVENTION

The invention is a color-coded body mass scale with a weight scale that measures and determines a person's weight, a height measuring device for determining the height of the person being weighed, a display unit for data input purposes, technical configuration and operation of the body mass related risk factor scale and a microprocessor for calculating, processing and organizing data associated with the body mass related risk factor scale. The body mass related risk factor scale also has a color liquid crystal diode display for displaying data, an internal battery for maintaining the time and date in the event of a power outage and a mini-printer to print data associated with the body mass related risk factor scale.

Accordingly, it is a principal object of the invention to provide a simple, fast, accurate, non-evasive and non-invasive way to determine the overall health of a person expressed as either a number or a color.

It is another object of the invention to provide a cost effective way of determining a person's overall health.

It is a further object of the invention to provide a scale that can weigh and measure a person's height while receiving specific physical and personal information that results in a body mass related risk factor.

Still another object of the invention is to provide a device that can act as a health-screening tool for a large mass of people.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
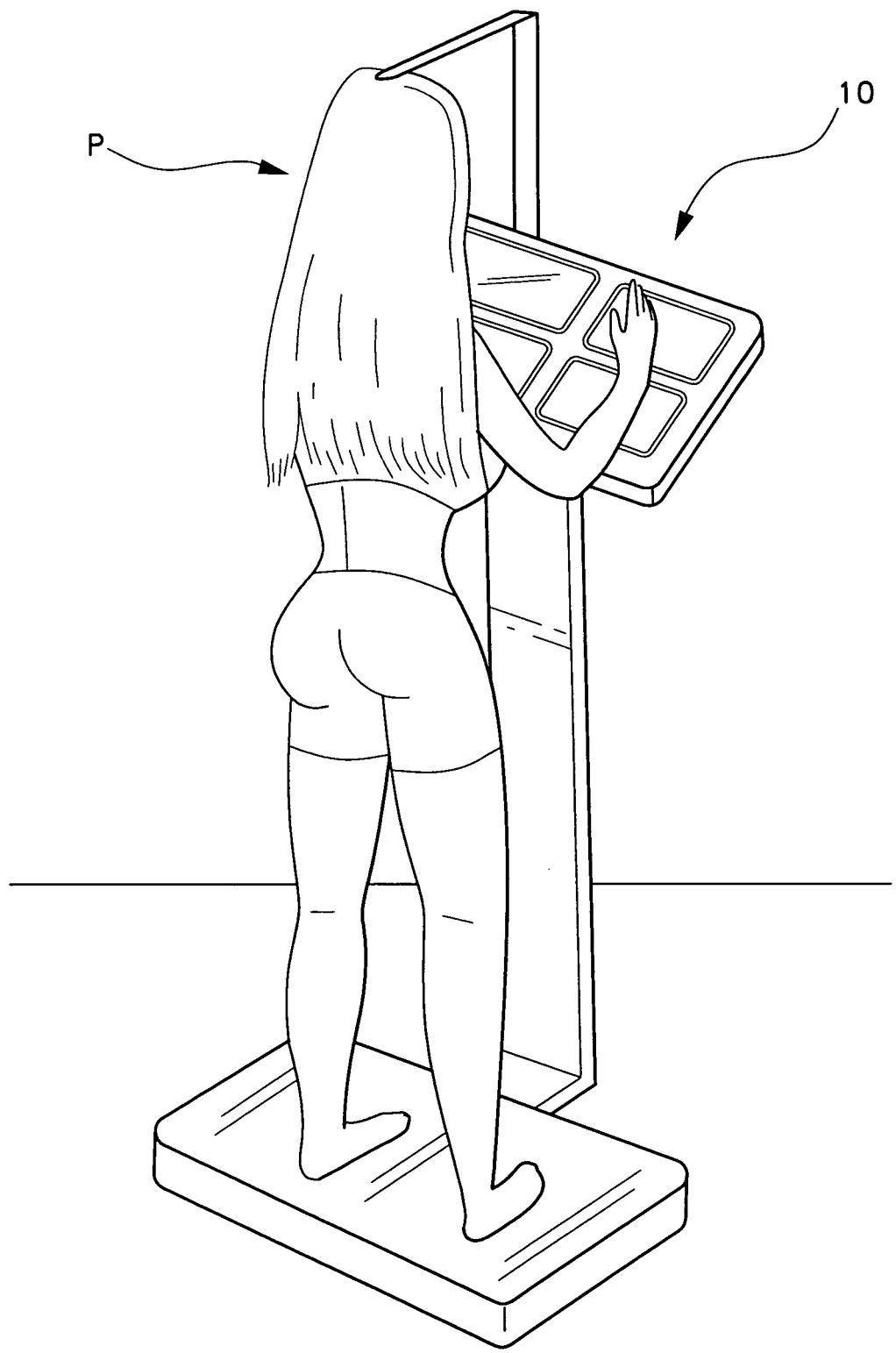
FIG. 1 is an environmental, perspective view of a body mass related risk factor scale according to the present invention.

The present invention is a body mass related risk factor scale 10, as is depicted in FIG. 1.

Figure 2:
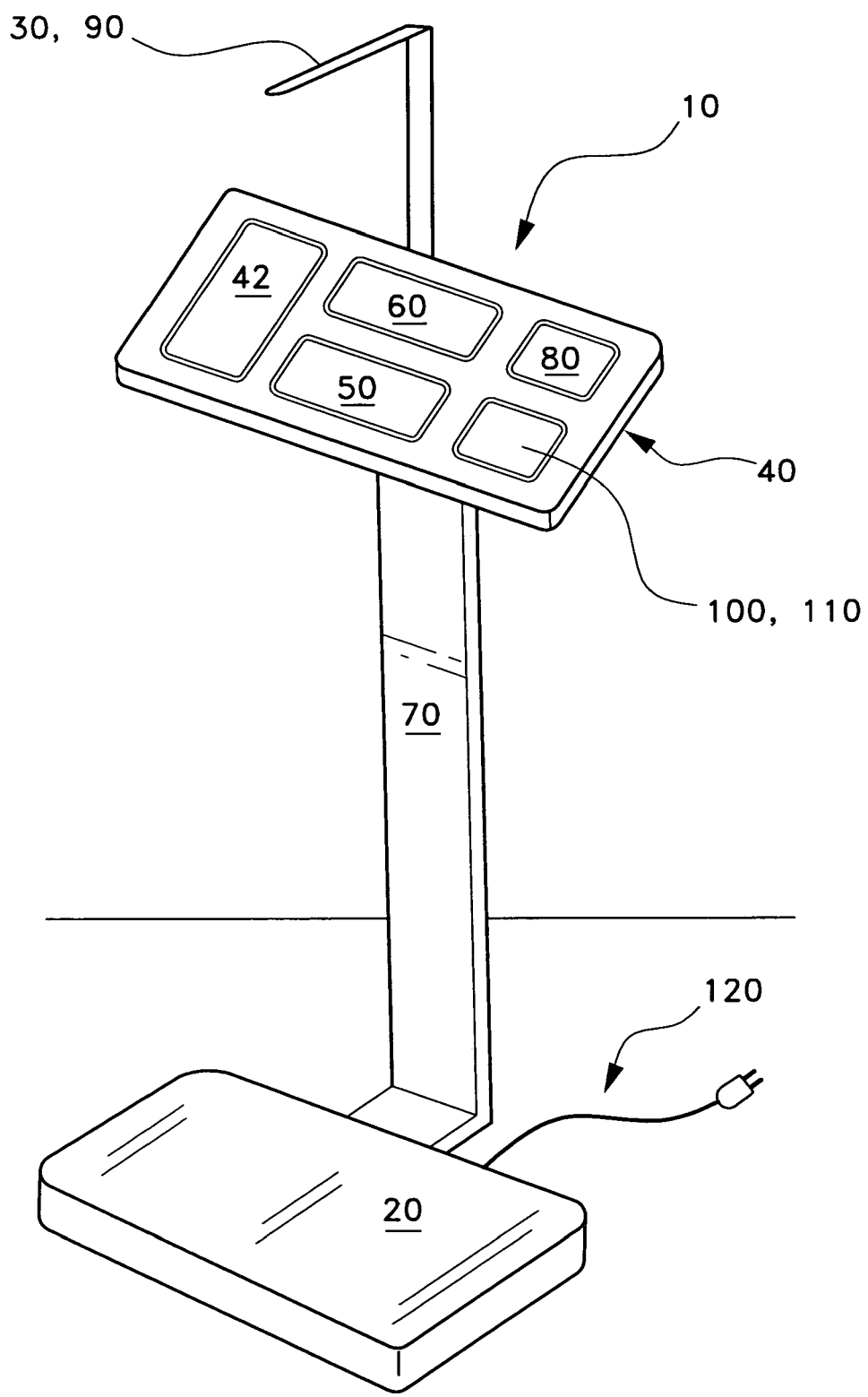
FIG. 2 is a front perspective view of the first embodiment of the body mass related risk factor scale.

The body mass related risk factor scale 10 comprises a weight scale 20 that measures and determines a person's P weight, a height measuring device 30 for determining the height of the person P being weighed, a mini-keyboard 50 for data input purposes, a set of specialized keys for technical configuration and operation of the body mass related risk factor scale 10 and a microprocessor (not shown) for calculating, processing and organizing data associated with the body mass related risk factor scale 10. The body mass related risk factor scale 10 further comprises a color liquid crystal diode display 60 for displaying data, an internal battery (not shown) for maintaining the time and date in the event of a power outage and a mini-printer 80 to print data associated with the body mass related risk factor scale 10. These specific features of the body mass related risk factor scale 10 are depicted in FIG. 2.

The body mass related risk factor scale 10 is controlled by a microprocessor (not shown) with read only memory, loaded with body mass index related data. The person P interacts with the body mass related risk factor scale 10 by feeding in their personal data such as age, gender and height while stepping on the weight scale 20 to determine their respective weight. The microprocessor (not shown) takes this data and calculates the personalized body mass of the person, compares it to their ideal body mass and displays the difference. This difference is called the body mass related risk factor 42 and can be displayed as a color to be interpreted by color-code. If the lifestyle of the person (i.e., athletic, sedentary) is also considered, that too can be incorporated into the body mass related risk factor 42.

When stepping on the body mass related risk factor scale 10, the person P stepping on the body mass related risk factor scale 10 will receive a negative number, zero or a positive number. A negative number indicates a body mass related risk factor 42 for an underweight person. This infers that it is not healthy to be an over-enthusiastic dieter or a person with an eating disorder. A body mass related risk factor 42 that is zero is an ideal result and indicates a person is at an ideal weight, regardless of their actual weight. This result should be the goal of every weight and health conscious person. The person with a positive number points out a body mass related risk factor 42 of a person who is overweight. This is also the most commonly occurring body mass related risk factor range.

The color-coding of the body mass related risk factor 42 further simplifies the use of the body mass related risk factor scale 10 with the use of several key colors. These color ranges from left to right are red, orange, yellow, green, yellow, orange and red. For example, the colors that are on the left side of the green color range are for minus values. A person who is in the green range is a person who is within the ideal body mass related risk factor range, while a person on the-right side of the green range are for positive values. Persons with a body mass related risk factor range in the red are at the greatest risk for health problems since the red ranges are the furthest from the green range. Closer body mass related risk factors 42 within the orange range reflect less severe problems than the red range and ranges in the yellow ranges reflect a body mass related risk factor 42 that is less severe than a body mass related risk factor 42 in the orange range.

Use of the body mass related risk factor scale 10 is straightforward. First, like any other scale in use, the person steps on the body mass related risk factor scale 10 and their respective weight is displayed in pounds or kilograms. The person will then be able to save the data for record keeping before stepping off and can proceed with a more sophisticated interactive mode by entering into the body mass related risk factor scale 10 their respective age, gender, height and weight (taken automatically). This is so that a body mass can be calculated and compared to the body mass indices in the microprocessor (not shown) before displaying the result as both a number and a color.

At the end of each weighing, the person will always be able to save desired data or print the data using a mini-printer (similar to a cash register printer) 80 built into the body mass related risk factor scale 10. There is also a mini-keyboard 50 for data input purposes, technical configuration and operation of the body mass related risk factor scale 10. Upon saving, the person P will be prompted to enter their first name, last name and/or a medical record number. A date and time will always be saved along with the person's P personal information. A password is also used for security purposes to prevent persons P from viewing each other's records. For maintenance and security purposes, the body mass related risk factor scale 10 is also equipped with an administrator's password. A special manual mode (not shown) will be available so that the administrator can calculate a person's P body mass related risk factor 42 without being present, once all the input values are known.

The display unit 40 of the body mass related risk scale 10 is equipped with several important features. First the body mass related risk factor scale 10 is provided with a height-measuring device in the form of an adjustable horizontal measuring bar 90. The display unit 40 includes a real-time clock and calendar 60 to indicate what time and date it is. The microprocessor (not shown) is provided with flash memory (not shown) that retains data in the event of a power outage. There is also a serial port (not shown) and/or a USB2 port (not shown), which are provided for data transfer with similar ports found on a personal computer (not shown).

Figure 3:
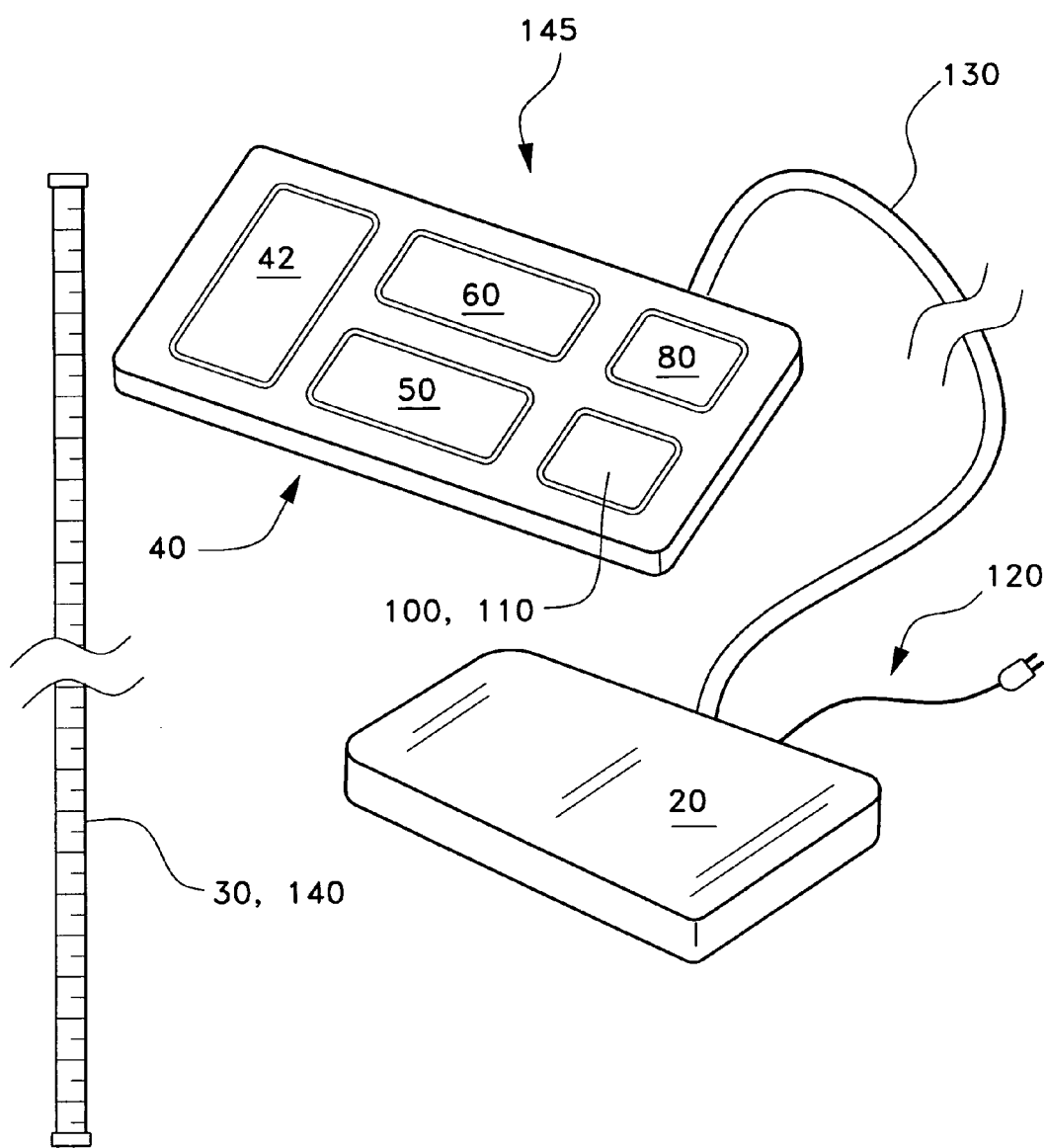
FIG. 3 is a front perspective view of the second embodiment of the body mass related risk factor scale.
Figure 4:
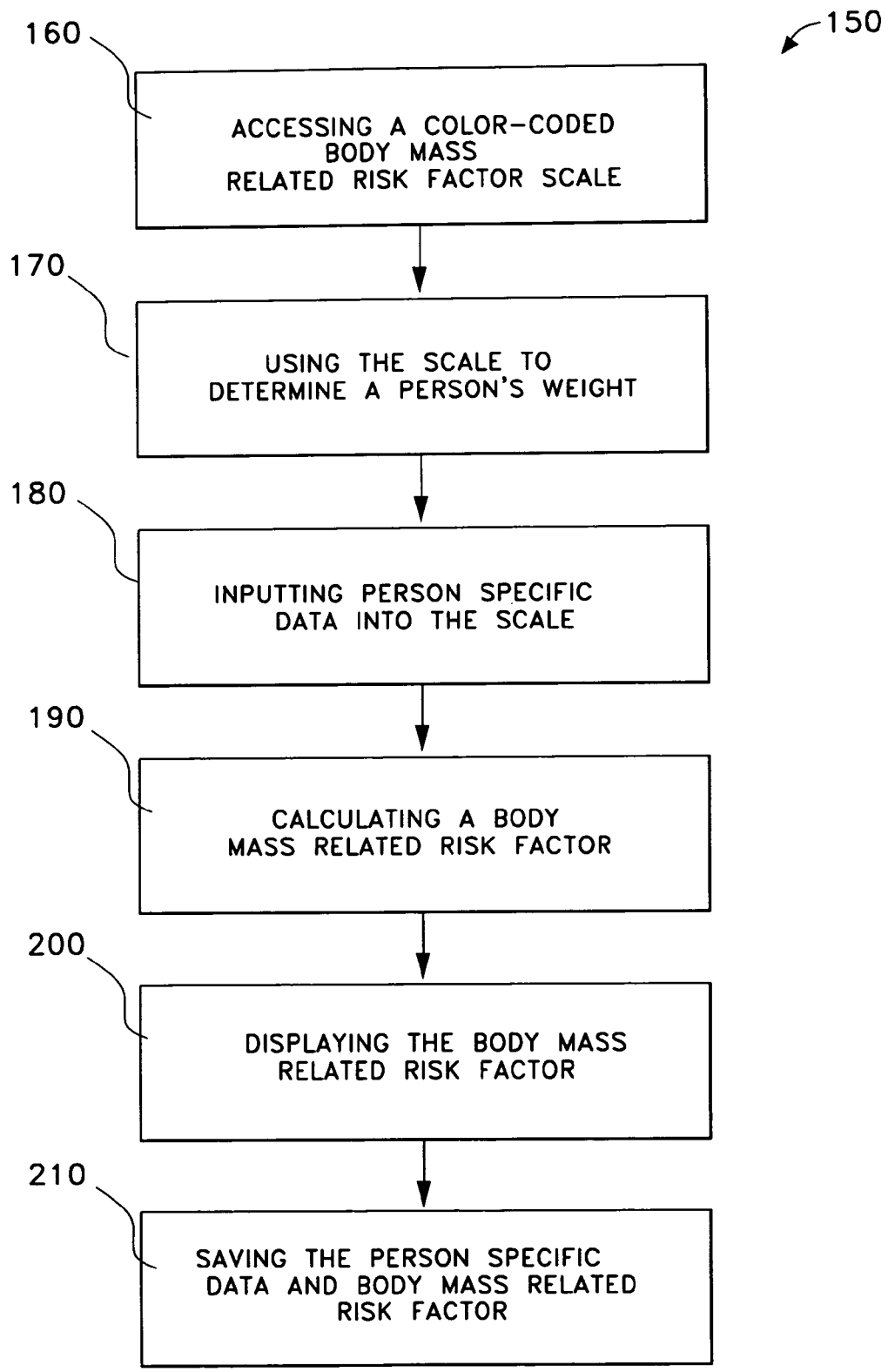
FIG. 4 is a flowchart of the overall method to use the body mass related risk factor scale.

FIG. 3 depicts a second embodiment of the body mass related risk factor scale 145. The second embodiment of the body mass related risk factor scale 145 is similar to the first embodiment of the body mass related risk factor scale 10, with some notable differences. First, there is a flexible cord 130 between the weight scale 20 and the display unit 40 (instead of a solid stand 70.). The weight scale 20 and the display unit 40 are slightly smaller on the second embodiment of the body mass related risk factor scale 145 than the first embodiment of the body mass related risk factor scale 10. There is also a different height-measuring device 30, with a measuring tape 140 used instead of an adjustable horizontal measuring bar 90. The second embodiment of the body mass related risk factor scale 145 is designed to be more mobile and flexible than the first embodiment of the body mass related risk factor scale 10. Also the display unit of the second embodiment 145 is wall mountable and is specially designed for home and personal use.

A method for determining the overall health of a person 150 can be used in combination with either embodiment of the body mass related risk factor scale 10, 145. The method for determining the overall health of a person 150 comprises the steps of accessing a body mass related risk factor scale 160, using the body mass related risk factor scale to determine a person's weight 170, inputting person specific data into the color-coded body mass scale 180, calculating a body mass related risk factor 190, displaying the body mass related risk factor as a number and a color-code 200 and saving the person specific data and the body mass related risk factor in the color-coded body mass scale 210. The method 150 also outlines the best mode of using the body mass related risk factor scale 10.

It is to be understood that the present invention is not limited to the embodiment described above, but encompasses any and all embodiments within the scope of the following claims.

We claim:

1. A body mass related risk factor scale, comprising:

a weight scale that measures and determines a person's weight;

a height measuring device for determining the height of the person being weighed;

a display unit for data input purposes, technical configuration and operation of the body mass related risk factor scale;

a microprocessor for calculating, processing and organizing data associated with the body mass related risk factor scale;

a color liquid crystal diode display for displaying data from the microprocessor;

an internal battery for maintaining the time and date in the event of a power outage;

a mini-printer to print data associated with the body mass related risk factor scale;

a computer readable memory for storing a database, said database including first, second and third data sets, said first data set having at least one first color associated therewith, said at least one first color visually representing a measured body mass less than an ideal body mass range calculated by said microprocessor, said second data set having at least one second color associated therewith, said at least one second color visually representing a body mass falling within said ideal body mass range, said third data set having at least one third color associated therewith, said at least one third color visually representing a body mass greater than said ideal body mass range;

client software to facilitate downloading data into a computerized system; and a reset button to reset the body mass related risk factor scale in case of malfunction, whereby said microprocessor compares the measured body mass with the first, second and third data sets to determine which of said at least one first color, at least one second color and at least one third color is displayed on said display unit to provide a visual indication of the person's overall health.

2. The scale according to claim 1, wherein, upon actuation of said weight scale, the person's weight is taken automatically, and the person must enter their age, gender, and height into the body mass related risk factor scale in order to determine their body mass related risk factor.

3. The scale according to claim 1, wherein the body mass related risk factor is further calculated as a numerical measure of the person's overall health.

4. The scale according to claim 1, wherein the height-measuring device is an adjustable horizontal measuring bar.

5. The scale according to claim 1, wherein the height-measuring device is a measuring tape.

6. The scale according to claim 1, wherein the display unit includes a real-time clock and calendar to indicate what time and date it is.

7. The scale according to claim 1, wherein the microprocessor is provided with read only memory.

8. The scale according to claim 1, wherein the microprocessor is provided with flash memory that retains data even after power has been turned off.

9. The scale according to claim 1, wherein the microprocessor is programmed with body mass indexes.

10. The scale according to claim 1, wherein a serial port and a USB2 port are provided for data transfer with similar ports found on a computer.

11. The scale according to claim 1, wherein a solid stand is set between the display unit and the weight scale.

12. The scale according to claim 1, wherein a flexible cord is used between the display unit and the weight scale.

* * * * *